US012760850B2

(12) United States Patent
Mutchler et al.

(10) Patent No.: US 12,760,850 B2
(45) Date of Patent: Oct. 13, 2026

(54) WORK LIGHT

(71) Applicant: MILWAUKEE ELECTRIC TOOL CORPORATION, Brookfield, WI (US)

(72) Inventors: Gregory A. Mutchler, Milwaukee, WI (US); Chelsea L. Rubietta, Oak Creek, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/982,404

(22) Filed: Dec. 16, 2024

(65) Prior Publication Data

US 2025/0207743 A1 Jun. 26, 2025

Related U.S. Application Data

(60) Provisional application No. 63/612,403, filed on Dec. 20, 2023.

(51) Int. Cl.

| | |
|---|---|
| ***F21L 4/00*** | (2006.01) |
| ***F21L 4/02*** | (2006.01) |
| ***F21L 4/04*** | (2006.01) |
| *F21Y 115/10* | (2016.01) |

(52) U.S. Cl.
CPC .................. *F21L 4/04* (2013.01); *F21L 4/02* (2013.01); *F21Y 2115/10* (2016.08)

(58) Field of Classification Search
CPC ..................................... F21L 4/04; F21L 4/02
See application file for complete search history.

(56) References Cited

U.S. PATENT DOCUMENTS

| | | | | |
|---|---|---|---|---|
| D659,867 | S | 5/2012 | Zhan | |
| D752,261 | S | 3/2016 | Ma | |
| D782,718 | S | 3/2017 | Ko | |
| D814,679 | S | 4/2018 | Pan et al. | |
| D853,006 | S | 7/2019 | Zou et al. | |
| 11,255,525 | B2 * | 2/2022 | Sergyeyenko | F21L 4/04 |
| D948,763 | S | 4/2022 | Petzl | |
| 11,448,372 | B2 | 9/2022 | Wenzel et al. | |
| D975,894 | S | 1/2023 | Bian et al. | |
| D993,506 | S | 7/2023 | Gao | |
| D1,014,822 | S | 2/2024 | Li | |
| D1,037,522 | S | 7/2024 | Rade et al. | |
| D1,042,925 | S | 9/2024 | Wang | |
| D1,051,462 | S | 11/2024 | Henley et al. | |

(Continued)

OTHER PUBLICATIONS

Catapult Pro https://web.archive.org/web/20220712213422/https://thrunite.com/catapult-pro/ available by at least Jul. 12, 2022 (Year: 2022).*

(Continued)

*Primary Examiner* — Gerald J Sufleta, II
(74) *Attorney, Agent, or Firm* — Michael Best & Friedrich LLP

(57) ABSTRACT

A work light including a body and a light head pivotally coupled to the body about a pivot axis. The body includes a user interface and a battery receptacle, the battery receptacle configured to receive a battery. The light head includes a housing, a light panel positioned within the housing and configured to be operated by the user interface, and a plurality of light emitting diodes (LEDs) supported on the light panel. The light head does not include a heat sink and has at least 1.5 LEDs per square inch.

20 Claims, 11 Drawing Sheets

(56) References Cited

U.S. PATENT DOCUMENTS

| | | | | |
|---|---|---|---|---|
| D1,056,289 | S | 12/2024 | Gordin et al. | |
| D1,063,152 | S | 2/2025 | Mi | |
| D1,083,175 | S | 7/2025 | Liang | |
| 2012/0033415 | A1 * | 2/2012 | Sharrah | F21V 21/0965 362/199 |
| 2013/0258650 | A1 * | 10/2013 | Sharrah | F21L 4/00 362/382 |
| 2019/0192953 | A1 * | 6/2019 | Thakkar | A63B 71/0669 |
| 2022/0221115 | A1 * | 7/2022 | Hopkins | F21V 23/0414 |
| 2022/0412516 | A1 | 12/2022 | Wenzel et al. | |
| 2024/0175569 | A1 | 5/2024 | Henley et al. | |
| 2025/0216040 | A1 | 7/2025 | Davis et al. | |
| 2025/0243978 | A1 | 7/2025 | Wenzel et al. | |

OTHER PUBLICATIONS

Klein Tools, "Klein Tools 56403 LED Light, Rechargeable Flashlight / Worklight with Kickstand, Magnetic Mount, and Carabiner, Charges Small Electronics, for Work, Camping," <https://www.amazon.com/Klein-Tools-56403-Rechargeable-Illumination/dp/B07V4FTX6c> web page visited Sep. 17, 2025 (11 pages).

Lutec, "Lutec Rechargeable Work Light, 1000 Lumens LED Magnetic Light with Magnetic Base and Hanging Hook , 360°Rotate and 200°Swivel for Car Repair, Emergency and Camping," <https://www.amazon.com/LUTEC-Rechargeable-Hook%EF%BC%8C360%C2%BORotate-200%C2%BOSwivel-Emergency/dp/B0D2VTQ96T> web page visited Sep. 17, 2025 (8 pages).

Milwaukee Electric Tool Corp., "Milwaukee M18 Packout Light/Charger (Bare Tool)," <https://www.amazon.com/Milwaukee-PACKOUT-Light-Charger-Bare/dp/B0F3LYZ523> web page visited Sep. 17, 2025 (6 pages).

* cited by examiner

WORK LIGHT

CROSS-REFERENCE TO RELATED APPLICATIONS

The present application claims priority to U.S. Provisional Application No. 63/612,403, filed Dec. 20, 2023, the entire contents of which are incorporated by reference herein.

FIELD OF THE INVENTION

The present disclosure relates to a work light and, more particularly, to a battery-powered work light.

BACKGROUND OF THE INVENTION

Work lights can be used to illuminate work areas that are otherwise difficult to light. Examples of these areas include work sites, ceiling spaces, basement areas, and the like.

SUMMARY OF THE INVENTION

In some implementations, the disclosure provides a work light including a body and a light head pivotally coupled to the body about a pivot axis. The body includes a user interface and a battery receptacle, the battery receptacle configured to receive a battery. The light head includes a housing, a light panel positioned within the housing and configured to be operated by the user interface, and a plurality of light emitting diodes (LEDs) supported on the light panel. The light head does not include a heat sink and has at least 1.5 LEDs per square inch.

In some implementations, the disclosure provides a work light including a body and a light head coupled to the body. The body includes a user interface and a battery receptacle, the battery receptacle configured to receive a battery. The light head includes a housing, a light panel positioned within the housing and configured to be operated by the user interface, and a plurality of light emitting diodes (LEDs) supported on the light panel. The light head has at least 1.5LEDs per square inch. The work light has a rated brightness level. The plurality of LEDs is configured to emit an actual brightness level over an entire operational period of the work light, and the actual brightness level is within 5% of the rated brightness level.

In some implementations, the disclosure provides a work light including a body and a light head coupled to the body. The body includes a user interface and a battery receptacle, the battery receptacle configured to receive a battery. The light head includes a housing, a light panel positioned within the housing and configured to be operated by the user interface, and a plurality of light emitting diodes (LEDs) supported on the light panel. The light panel includes an edge that is in direct contact with the housing. A side of the light panel opposite from the plurality of LEDs defines an air gap between the light panel and the housing.

Other features and aspects of the disclosure will become apparent by consideration of the following detailed description and accompanying drawings.

DETAILED DESCRIPTION

Figure 1:
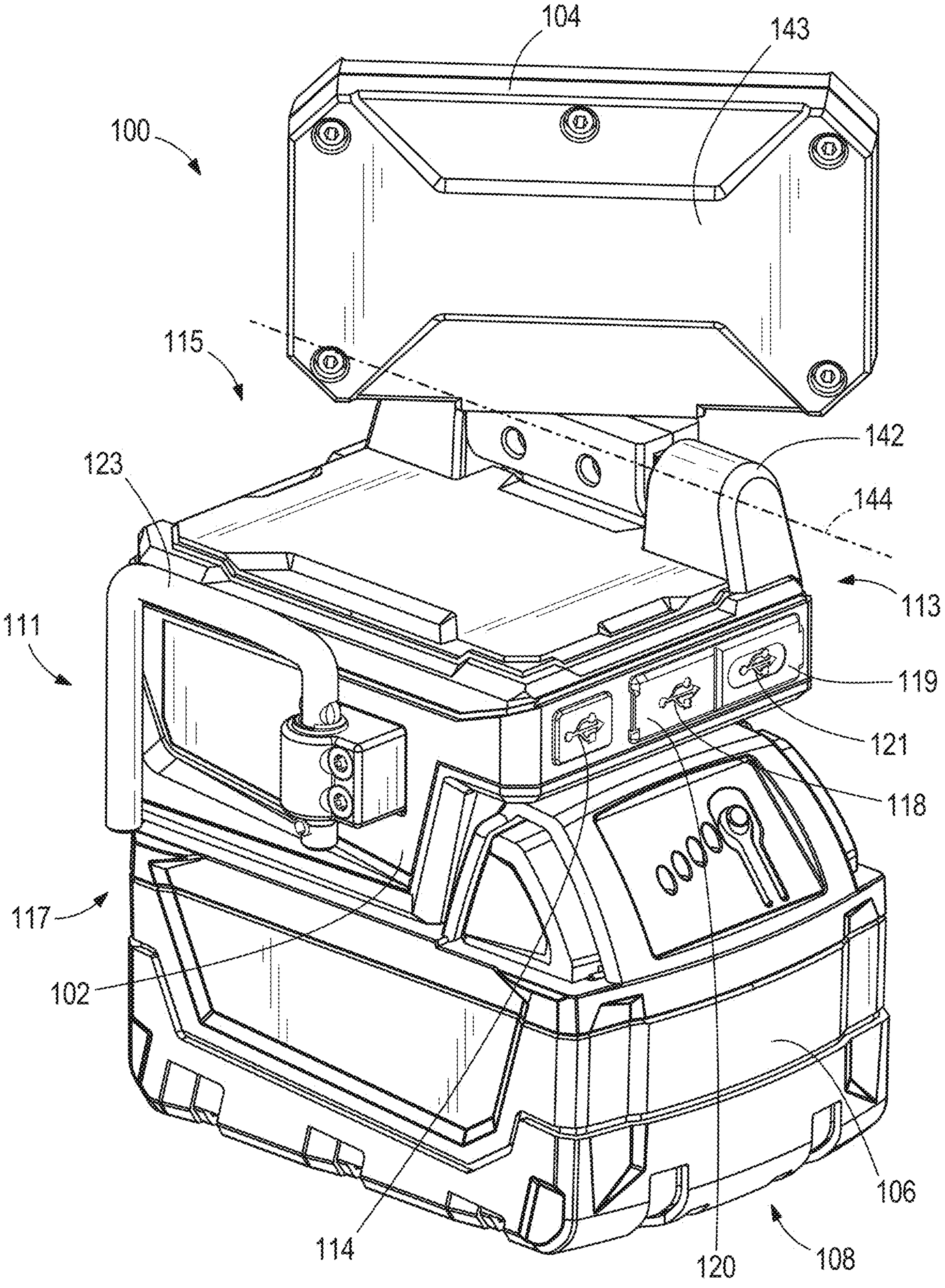
FIG. 1 is a front perspective view of a work light and a battery according to an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

FIGS. 1-7 illustrate a work light 100 according to an embodiment of the present disclosure. The illustrated work light 100 is battery-powered. The work light 100 is sized and shaped for easy transport. In particular, the work light 100 is relatively small such that the work light 100 can be carried to different locations in a single hand and can fit in relatively small spaces. The work light 100 includes a body 102 and a light head 104 coupled to the body 102. A battery 106 is also removably coupled to the body 102. The body 102 includes a front 108, a rear 110 opposite the front 108, a first side 111, a second side 113 opposite the first side 111, a top 115, and a bottom 117 opposite the top 115. The work light 100 also includes a circuit board 147 (FIGS. 9 and 10) positioned within the body 102 and a heat sink 149 coupled to the circuit board 147. The circuit board 147 is coupled to the other components of the work light 100 and configured to control operation of the work light 100.

In the illustrated embodiment, the work light 100 includes a user interface. The illustrated user interface includes a power button 112 and a mode switching button 109. In other embodiments, the user interface may include fewer or more buttons or may include different types of actuators (e.g., slider switches, rotatable dials, etc.). The power button 112 and mode switching button 109 are disposed on the rear 110 of the work light 100. In alternate embodiments, the power button 112 and mode switching button 109 may be disposed on the front 108 or on a different surface of the body 102. The power button 112 is operable to turn the light panel 146 ON and OFF. The mode switching button 109 is operable to change an output mode of the light panel 146. For example, the light panel 146 may be operable in a HIGH mode, a MEDIUM mode, a LOW mode, and an ECO mode. In some embodiments, the light panel 146 may produce light having a brightness of 1000 Lumens or more in the HIGH mode, a brightness of 500 Lumens in MEDIUM mode, a brightness of 300 Lumens or less in the LOW mode, and a brightness of 88 lumens or less in ECO mode. The work light 100 is operable to switch modes by actuating the mode switching button 109. More specifically, once a user has powered on the work light 100 by pressing the power button 112, the user may short press the mode switching button 109 to cycle between HIGH mode, MEDIUM mode, and LOW mode. To switch to ECO mode, the user may press and hold the mode switching button 109. To exit ECO mode, the user may press the mode switching button 109. In other embodiments, the light panel 146 may be operable in different modes and/or may be switchable between the modes by the power button 112.

The work light 100 also includes a wake button 114, a first port 118, and a second port 119. The wake button 114, the first port 118, and the second port 119 are disposed on the front 108 of the body 102. In the illustrated embodiment, the first port 118 is a USB-A port and the second port 119 is a USB-C. The first port 118 and the second port 119 are each selectively covered with a port cover 120, 121 moveably connected to the body 102. In the illustrated embodiment, the port cover 120, 121 pivots and raises relative to the front 108 of the body 102, while remaining connected to the body 102, to selectively uncover the first port 118 and second port 119, respectively. In other embodiments, other suitable covers may be used. The first port 118 and the second port 119 may be utilized to charge a device, such as a user's cell phone. The first port 118 and the second port 119 deliver approximately 27 Watts. Additionally or alternatively, the first port 118 and the second port 119 may be used as a power input port to charge the battery 106 without the need for removing the battery 106 from the work light 100. The wake button 114 may be engaged by a user in order to activate the port 118 for energy output to charge and/or power an external device. In alternate embodiments, the work light 100 may include fewer or more ports. Alternatively or additionally, the ports may be disposed on other portions of the work light 100. Some or all of the controls and indicators may instead be disposed on other portions of the work light 100 or may be omitted entirely.

Figure 2:
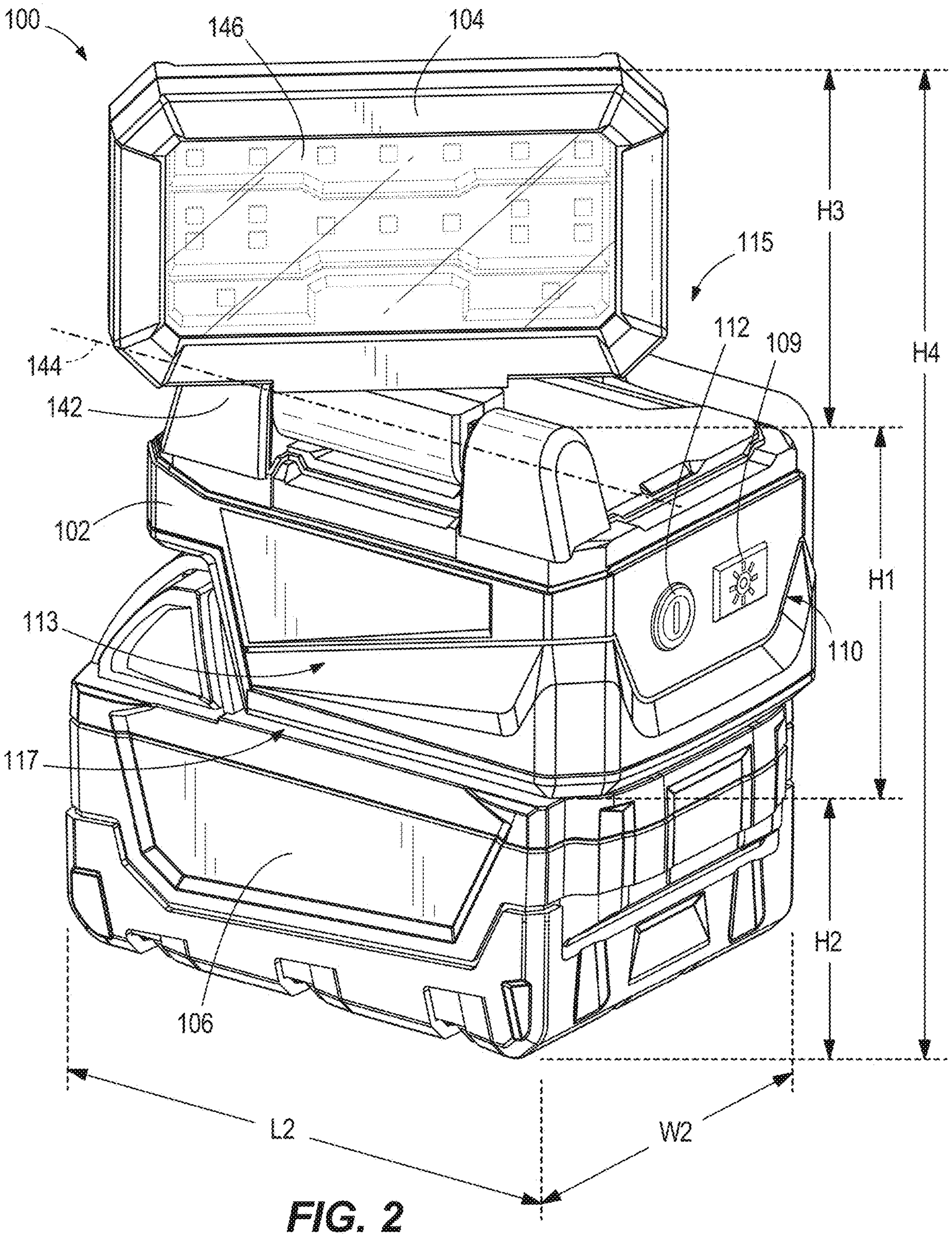
FIG. 2 is a rear perspective view of the work light and the battery of FIG. 1.
Figure 4:
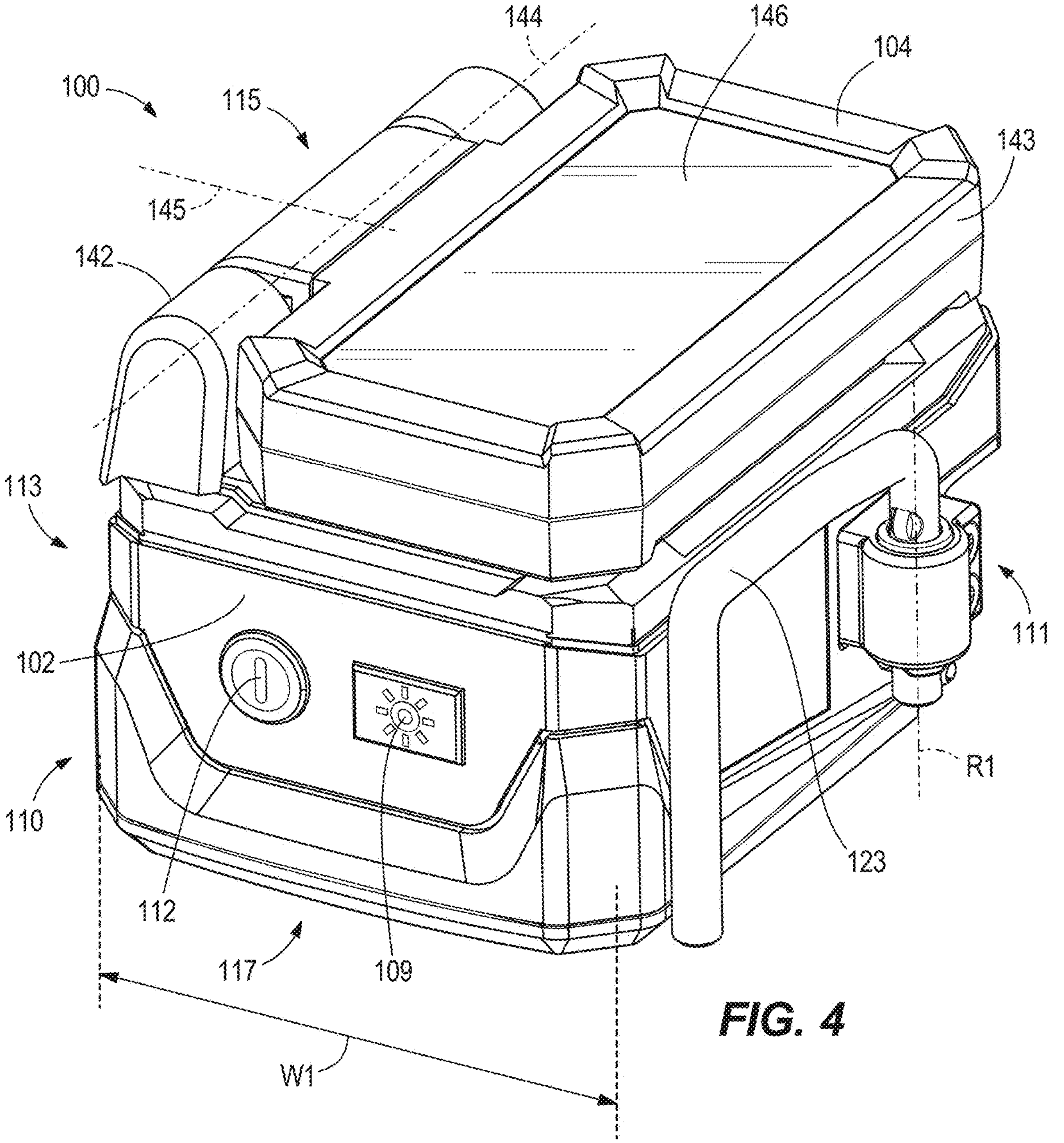
FIG. 4 is a rear perspective view of the work light of FIG. 1.
Figure 5:
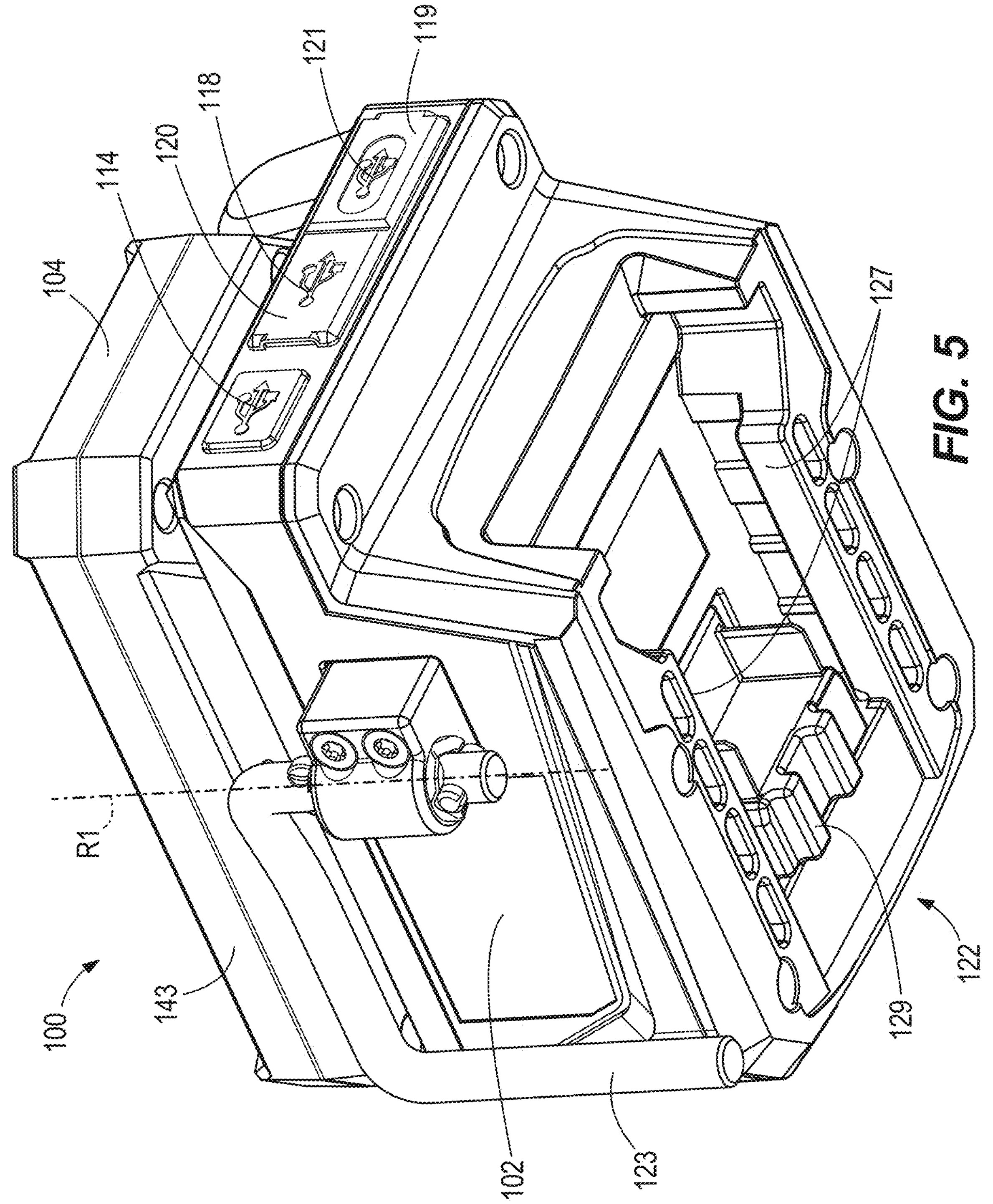
FIG. 5 is a bottom perspective view of the work light of FIG. 1.

As shown in FIGS. 2, 4, and 5, the work light 100 includes a rafter hook 123. In the illustrated embodiment, the rafter hook 123 is disposed on the first side 111 of the body 102. In other embodiments, the rafter hook 123 may be disposed on another side of the body 102. The rafter hook 123 is generally u-shaped and is rotatable about a rafter hook axis R1. The rafter hook axis R1 extends in a direction generally parallel to the first side 111. The rafter hook 123 is rotatable about the axis R1 from a first or stowed position (as shown in FIGS. 2 and 4) to a second or deployed position. In the stowed position, the rafter hook 123 lays generally flat against the first side 111. In the deployed position, the rafter hook 123 is not in contact with the body 102 of the work light 100. For example, the rafter hook 123 may extend generally perpendicularly from the first side 111. When in the deployed position, the rafter hook 123 can hang on a rafter or other suitable structure. The rafter hook 123 is configured to support the combined weight of the work light 100 and the battery 106. In some embodiments, the rafter hook 123 may be releasably secured in the stowed position and the deployed position by a detent-type mechanism. Alternatively, the rafter hook 123 may be moved and held to any position between the stowed position and the deployed position.

Figure 3:
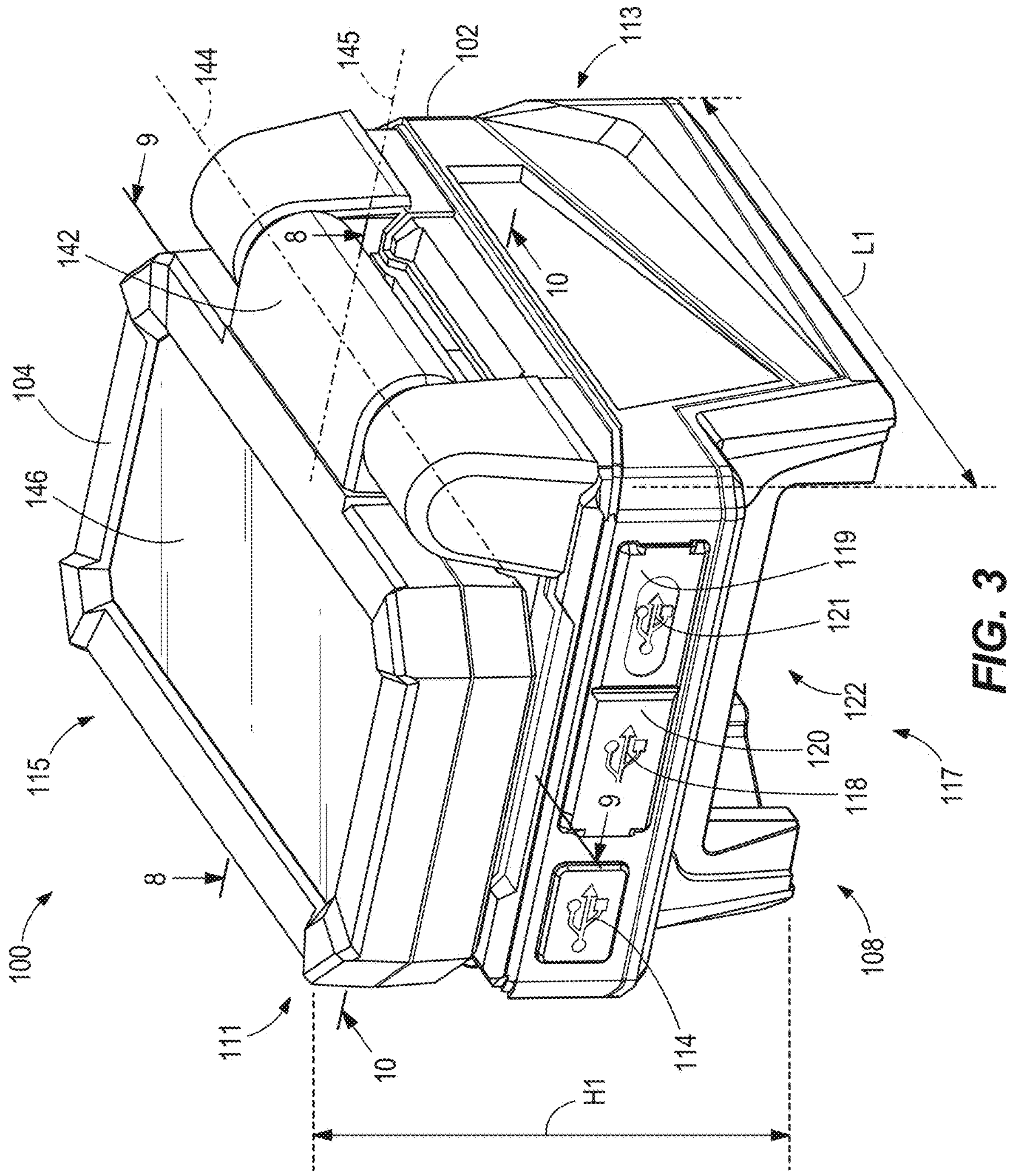
FIG. 3 is a front perspective view of the work light of FIG. 1.

As shown in FIGS. 3 and 4, the body 102 has a length L1 measured from the front 108 to the rear 110, a height H1 measured from the top 115 to the bottom 117, and a width W1 measured from the first side 111 to the second side 113. The length L1, width W1, and height H1 extend substantially perpendicular to one another. In the illustrated embodiment, the work light 100 may be sized and shaped for single-handed transport. In some embodiments, the length L1 of the body 102 may be between about 3 inches and about 6 inches (between about 7.6 centimeters and about 15.2 centimeters). For example, the length L1 may be about 4 inches (about 10.2 centimeters). In some embodiments, the width W1 of the body 102 may be between about 2 inches and about 5 inches (between about 5.1 centimeters and about 10.2 centimeters). For example, the width W1 may be about 3.5 inches (about 8.89 centimeters). In some embodiments, the height H1 of the body 102 may be between about 1 inch and about 6 inches (between about 2.5 centimeters and about 15.2 centimeters). For example, the height H1 may be about 2.6 inches (about 6.6 centimeters).

Shown best in FIG. 5, the body 102 of the work light 100 further includes a battery receptacle 122. In the illustrated embodiment, the battery receptacle 122 is disposed on the bottom 117 of the body 102. Stated another way, the battery 106 couples to the body 102 on the bottom 117 of the body 102, thus supporting the work light 100. The battery 106 therefore supports the work light when the battery 106 is received in the battery receptacle 122. The battery receptacle 122 receives at least a portion of the battery 106 to power the work light 100. In the illustrated embodiment, the battery receptacle 122 is open on two sides of the body 102 such that the battery 106 is slidably received in the battery receptacle 122. In the present embodiment, the battery receptacle 122 is oriented such that the battery 106 is slidably received in the battery receptacle 122 in a direction that is parallel with the length L1 of the body 102. The battery receptacle 122 includes rails 127 configured to slidably receive a portion of the battery 106. The battery receptacle 122 also includes a plurality of battery contacts 129 configured to electrically engage with the battery 106. The battery receptacle 122 therefore both physically and electrically connects with the battery 106.

Although various sizes and shapes of batteries may be removably coupled to the body 102 of the work light 100, only a single embodiment of a battery 106 has been shown. Other batteries may be smaller or larger than the battery 106 shown, and these other batteries may also have different shapes from the battery 106 shown. These other batteries may or may not be useful for providing one or more support surfaces to stand the work light 100 or lay the work light 100 in one or more positions. In the illustrated embodiment, the battery 106 is a power tool battery pack that may also be used with, for instance, an electric drill. The battery 106 is an 18-volt Lithium-Ion battery. Other voltages and chemistries may also be used in other embodiments. The battery 106 includes electrical contacts which electrically connect the battery with the battery contacts 129 of the work light 100. The battery 106 additionally includes protrusions and latches which correspond with the rails 127 within the battery receptacle 122.

In the present embodiment, the work light 100 is smaller than the battery 106 such that the battery 106 supports the work light 100. Referring to FIG. 2, the length L1 of the body 102 may less than a length L2 of the battery 106 (FIG. 2). For example, the length L1 of the body 102 may be between about 40% and about 90% of the length L2 of the battery 106. In some embodiments, the length L1 of the body 102 may be between about 50% and about 85% of the length L2 of the battery 106. In some embodiments, the height H1 of the body 102 is less than a height H2 of the battery 106. For example, the height H1 of the body 102 may be between about 40% and about 90% of the height H2 of the battery 106. In some embodiments the height H1 of the body 102 and the light head 104 may be between about 60% and about 90% of the height H2 of the battery 106. The width W1 of the body 102 may be generally equal to a width W2 of the battery 106. In some embodiments, the width W1 of the body 102 may be less than the width W2 of the battery 106.

When the body 102 of the work light 100 is coupled to the battery 106, the body 102, light head 104, and battery 106 define a total height H4 of the work light 100. In the illustrated embodiment, the total height H4 is approximately triple the height H1 of the body 102. In some embodiments, a total height H4 of the work light 100, including the battery 106, may be about six inches (about 15 centimeters).

With reference to FIGS. 1-3, the light head 104 is pivotably and rotatably connected to the body 102. In the illustrated embodiment, the light head 104 is coupled to the body 102 on a side opposite the rafter hook 123. As shown in FIG. 3, the light head 104 is coupled to the body 102 by a hinge 142. The hinge 142 is coupled to the top 115 of the body 102 adjacent the second side 113. The light head 104 is pivotable via the hinge 142 relative to the body 102 about a pivot axis 144. The pivot axis 144 extends in a direction parallel to the length L1 of the body 102. The light head 104 is also rotatable via the hinge 142 relative to the body 102 about a rotation axis 145. The rotation axis 145 extends perpendicular to the pivot axis 144.

The light head 104 is pivotable relative to the body 102 about the pivot axis 144 between a stowed position (FIG. 1) and a deployed position (FIG. 2). In the stowed position, the light head 104 is in contact the body 102. A pivoting range of the light head 104 may, therefore, be limited by the body 102. For example, the light head 104 may pivot about the pivot axis 144 until the light head 104 contacts with the body 102. In such embodiments, the light head 104 may pivot about 270 degrees. In other embodiments, the pivoting range of the light head 104 may be limited by the hinge 142 to a smaller range (e.g., 180 degrees, 90 degrees, etc.). In the illustrated embodiment, the light head 104 is movable to several different stowed positions. For example, in a first stowed position (as shown in FIG. 1), the light head 104 is in contact with the top 115 of the body 102 and faces away from the body 102. In a second stowed position, the light head 104 is in contact with the top 115 of the body 102 and faces toward the body 102. In a third stowed position, the light head 104 is in contact with the second side 113 of the body 102 and faces away from the body 102. In a fourth stowed position, the light head 104 is in contact with the second side 113 of the body 102 and faces toward the body 102.

In the deployed position (FIG. 2), the light head 104 extends outwardly from the body 102 and is not in contact with the body 102. The deployed position may be any position between the first (or second) stowed position and the third (or fourth) stowed position. When in the deployed position, the light head 104 is rotatable about the rotation axis 145 to change an orientation of the light head 104 relative to the body 102. For example, the light head 104 may be rotated to emit light generally in a direction of the front 108 of the body 102, the rear 110 of the body 102, the first side 111 of the body 102, the second side 113 of the body 102, or any position in between. Rotation about the rotation axis 145 also allows the light head 104 to face toward or away from the body 102 when in one of the stowed positions. In some embodiments, the light head 104 may rotate 300 about the rotation axis 145. In other embodiments, a rotation range of the light head 104 may be more limited (e.g., 180 degrees) by the hinge 142, or the light head 104 may rotate 360 degrees or continuously rotate about the rotation axis 145.

Figure 8:
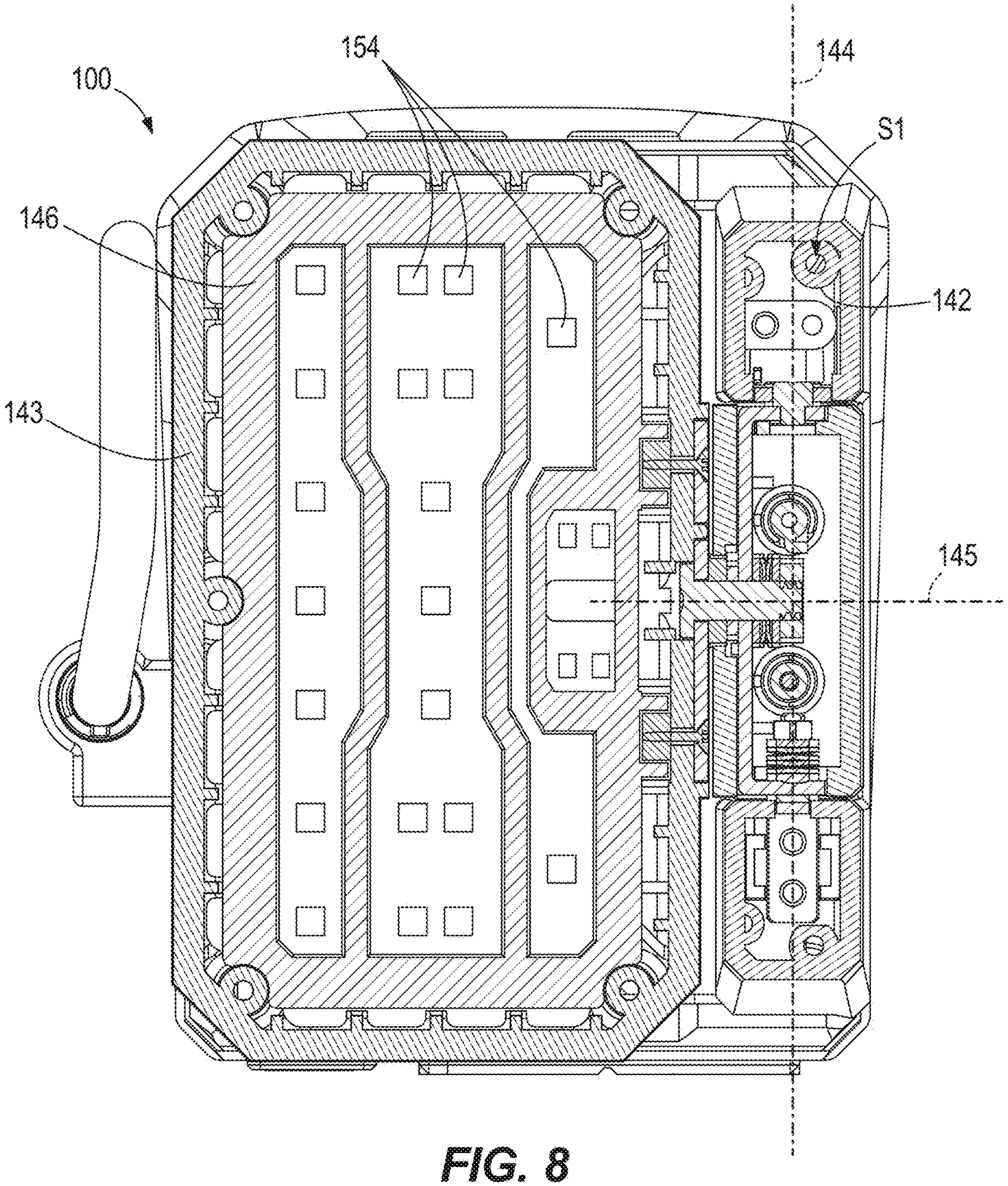
FIG. 8 is a cross-sectional view of a light head of the work light taken through section line 8-8 of FIG. 3.

As shown in FIG. 8, the light head 104 may include a snap mechanism S1 within the hinge 142 that biases the light head 104 to one or more of the positions. The snap mechanism S1 may include ramped springs or washers that resist being left in certain positions and urge the hinge 142 toward other positions. For example, when the light head is pivoted near (e.g., within 10 degrees) one of the stowed positions, the snap mechanism S1 biases the light head 104 to the corresponding stowed position. Additionally, the snap mechanism S1 may be designed to bias the light head 104 to a deployed position where the light head 104 extends perpendicular from the top 115 of the body 102. In some embodiments, the snap mechanism S1 may bias the light head 104 to a plurality of different deployed positions in, for example, 30 degree or 45 degree increments.

Figure 6:
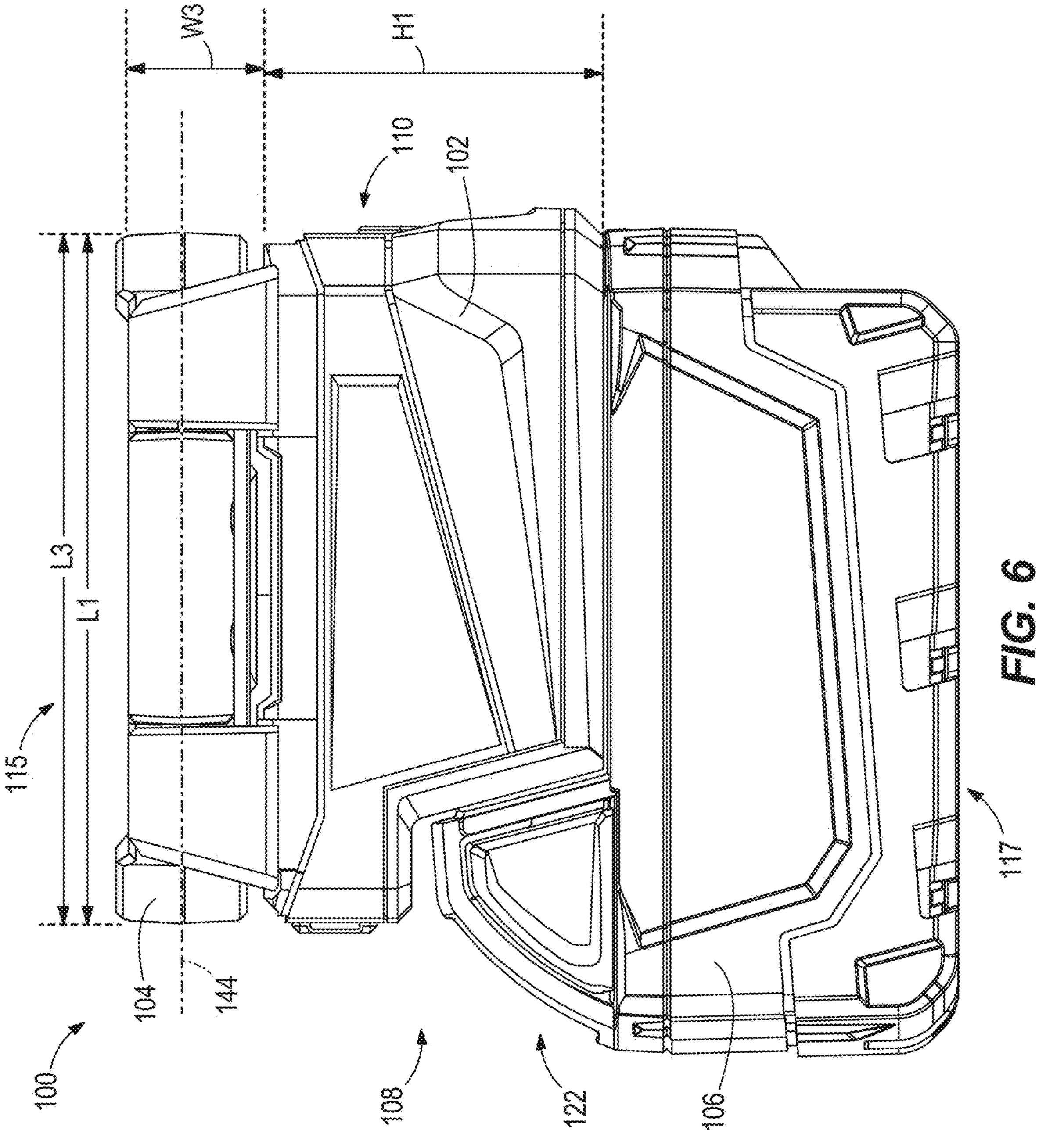
FIG. 6 is a side plan view of the work light and the battery of FIG. 1.
Figure 7:
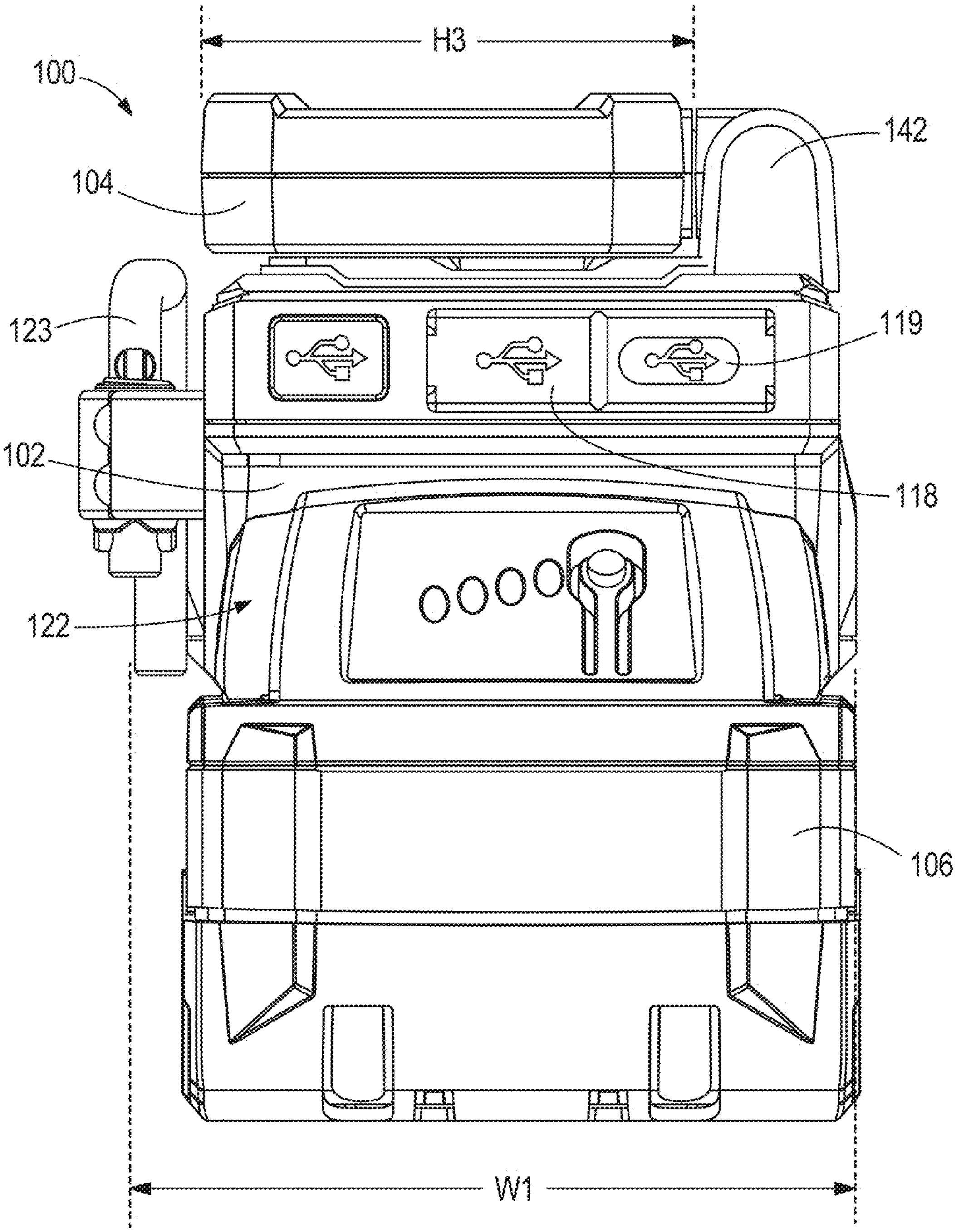
FIG. 7 is a front plan view of the work light and the battery of FIG. 1.

As shown in FIGS. 6 and 7, the light head 104 has the length L3 parallel to the length L1 of the body 102, a height H3, and a width W3. In the first or second stowed positions, the height H3 is parallel to the height H1 of the body 102 and the width W3 is parallel to the width W1 of the body 102. In the third or fourth stowed position, the height H3 is parallel to the width W1 of the body 102 and the width W3 is parallel to the height H1 of the body 102. In some embodiments, the length L3 of the light head 104 is between about 3 inches and about 6 inches (between about 7.6 centimeters and about 15.2 centimeters). For example, the length L3 of the light head 104 may be about 4 inches (about 10.2 centimeters). In some embodiments, the width W3 of the light head 104 is between about 0.5 inches and about 1 inch (between about 1.3 centimeters and about 2.5 centimeters). For example, the width W3 of the light head 104 may be about 0.66 inches (about 1.7 centimeters). In some embodiments, the height H3 of the light head 104 is between about 1 inch and about 6 inches (between about 2.5 centimeters and about 15.2 centimeters). For example, the height H3 of the light head 104 may be about 2.2 inches (about 5.6 centimeters). The light head 104 also has an output area equal to the length L3 times the height H3. The output area is the area of a light panel from which light is emitted. In some embodiments, the output area is between 3 square inches and 36 square inches (between about 19 square centimeters and about 232 square centimeters). In other embodiments, the output area is between 6 square inches and 18 square inches (between about 38 square centimeters and about 116 square centimeters). For example, the output area of the light head 104 may be about 8.8 square inches (about 56 square centimeters).

Figure 9:
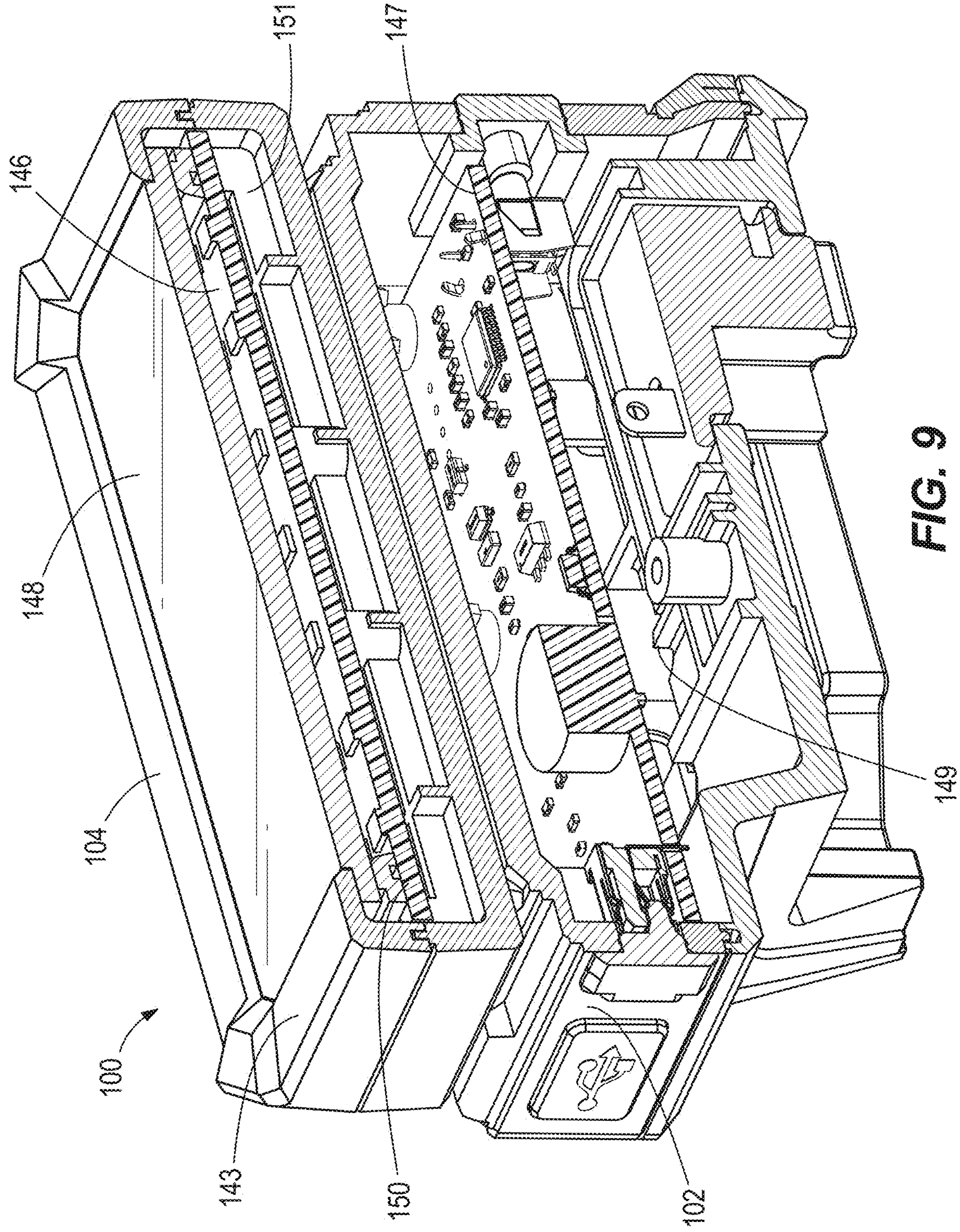
FIG. 9 is a cross-sectional view of the work light taken through section line 9-9 of FIG. 3.
Figure 10:
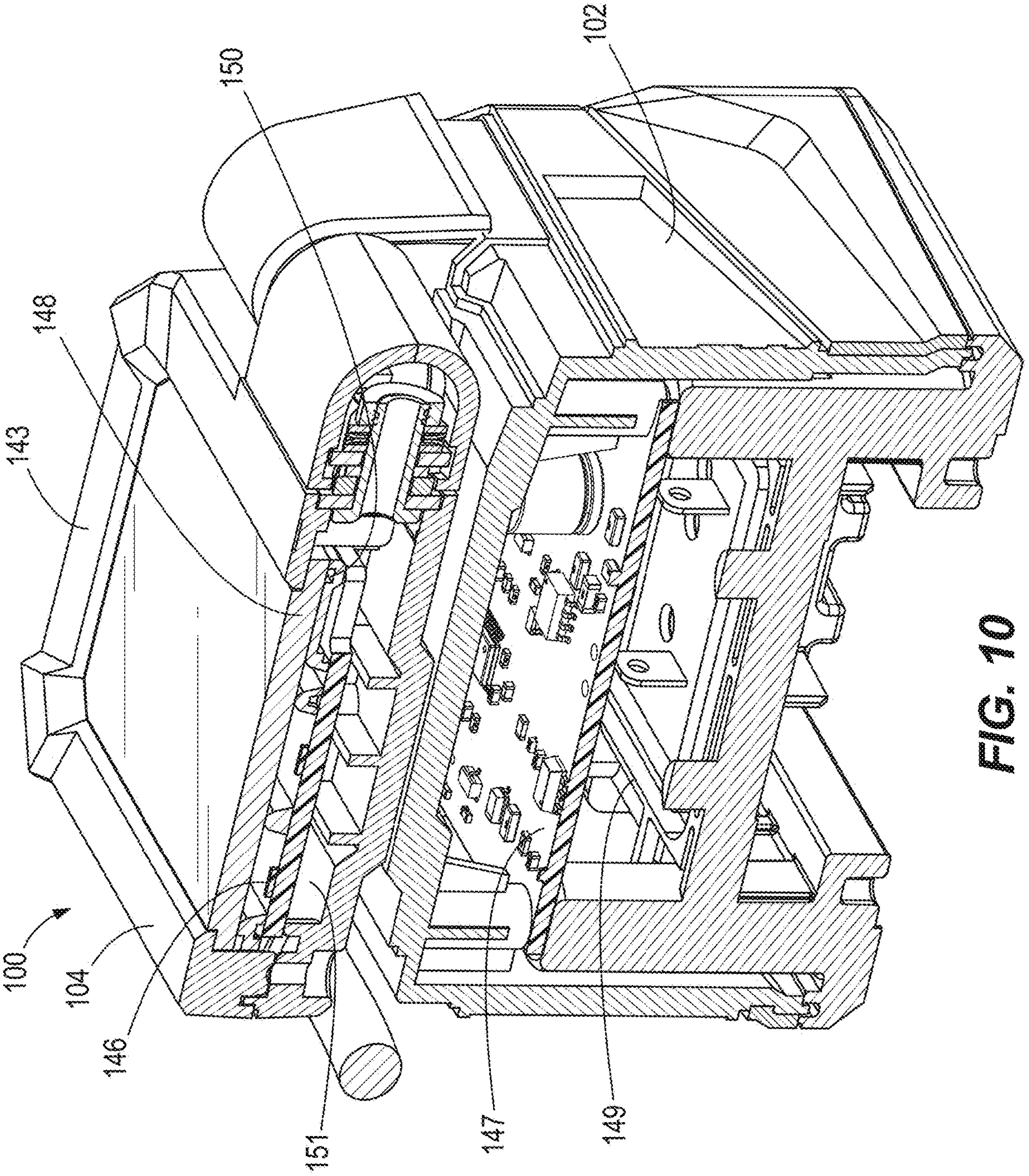
FIG. 10 is a cross-sectional view of the work light taken through section line 10-10 of FIG. 3.

Referring to FIG. 8-10, the illustrated light head 104 includes a housing 143, a light panel 146, and a plurality of light emitting diodes (LEDs) 154 supported on the light panel 146. The housing 143 at least partially surrounds the light panel 146 to support and protect the light panel 146. The housing 143 may be made of an insulative or conductive plastic. The light panel 146 is a relatively thin, planar member or plate. The light panel 146 may be made of metal, such as aluminum. The light panel 146, and the light head 104 itself, may be any size. In the illustrated embodiment, the light panel 146 extends along a majority of the length L1 of the body 102 of the work light 100. The light panel 146 is positioned to be in direct contact with the housing 143. The housing 143 may, therefore, help dissipate heat produced by the light panel 146. The illustrated light head 104 also includes a lens 148 that is coupled to the housing 143 and covers the light panel 146 and LEDs 154, and a gasket 150 positioned between the lens 148 and the light panel 146.

The illustrated light head 104 includes more LEDs 154 than a conventional light head having a similar output area. In the illustrated embodiment, the light head 104 includes twenty (20) LEDs 154. In other embodiments, the light head 104 may include fewer or more LEDs 154 (e.g., 15 LEDs, 18 LEDs, 22 LEDs, 25 LEDs, etc.). Since the output area of the illustrated light head 104 is approximately 8.8 square inches, the light head 104 has at least 1.5 LEDs per square inch. In some embodiments, the light head 104 may have at least 2 LEDs per square inch. In the illustrated embodiment, the light head 104 has about 2.2 LEDs per square inch.

Including more LEDs 154 per square inch unexpectedly produces less heat than a conventional light head of similar size with fewer LEDs. In particular, including at least 1.5 LEDs per square inch allows each LED 154 to run at a more efficient state such that the LEDs 154 do not have to be driven as hard to achieve a desired brightness. Additionally, since the LEDs 154 are not driven as hard, the LEDs 154 are less likely to generate excess heat. As such, the LEDs 154 do not need to be throttled down over time, which would reduce a brightness output by the light head 104. In contrast, similarly-sized light heads with fewer LEDs per square inch typically drive the LEDs harder to achieve a desired brightness. Since the LEDs are driven harder, the LEDs are more likely to generate excess heat, which may cause the LEDs to be throttled down and a brightness output by the light head to decrease significantly during operation.

In the illustrated embodiment, the work light 100 has a rated brightness level of 1000 lumens. In some embodiments, the rated brightness level may be at least 1000 lumens. In other embodiments, the rated brightness level may be between 800 and 1200 lumens. In still other embodiments, the rated brightness level may be higher or lower. The LEDs 154 are configured to emit an actual brightness level over an entire operational period of the work light 100. The entire operational period is the period of time from when the work light 100 is turned ON to when the work light 100 is turned OFF, or the battery 106 runs out of power. Because the LEDs 154 do not need to be throttled down due to generating excess heat, the actual brightness level is maintained within 5% of the rated brightness level over the entire operational period. In other words, the brightness of the work light 100 during operation generally remains around the same brightness during the entire operational period. In contrast, conventional work lights are typically ramped-down during their operational periods. For example, when a conventional work light is turned on, the work light may initially operate at its rated brightness level for a relatively short period of time (e.g., 30 seconds). After that short period of time, the brightness output by the work light may gradually decrease to a lesser brightness level (e.g., 50% of the rated brightness level) to reduce heat generated by the LEDs and/or extend the life of the battery.

With reference to FIGS. 9 and 10, since the light head 104 operates at a comparably efficient state, the light head 104 does not include a heat sink. An edge of the light panel 146 may be in direct contact with the housing 143 to help transfer and dissipate heat outside of the housing 143. However, a side of the light panel 146 opposite from the LEDs 154 (which would typically be coupled to a heat sink) instead defines an air gap 151 between the light panel 146 and the housing 143. This configuration allows for heat to be dissipated through the air gap 151 and through the housing 143. The air gap 151 also functions as an insulator. In some embodiments, the side of the light panel 146 opposite from the LEDs may be in direct contact with an inner surface of the housing 143. Since the light head 104 does not include a heat sink and only the body 102 includes the heat sink 149, the work light 100 is lighter than similarly-sized work lights.

Figure 11:
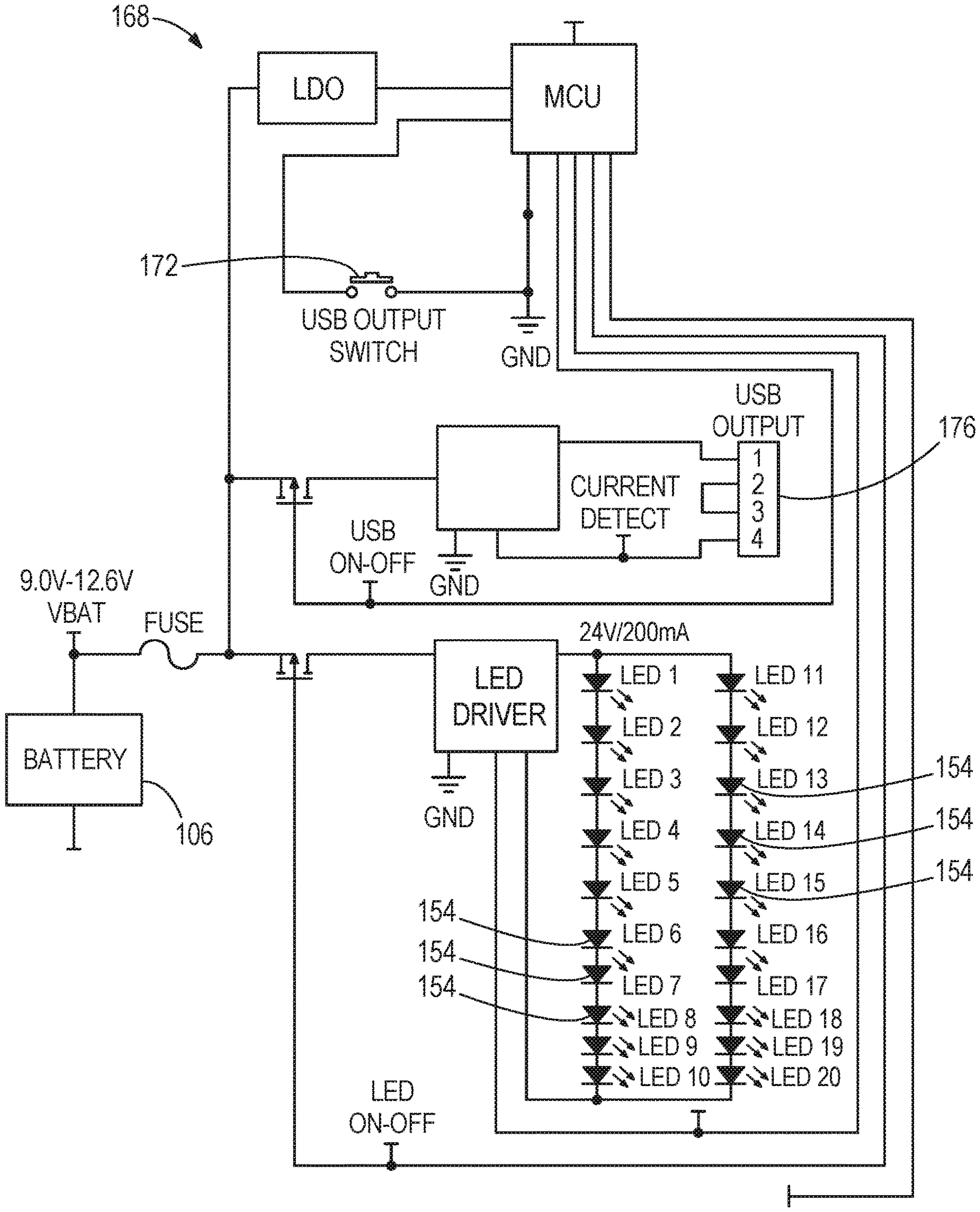
FIG. 11 is a circuit diagram of the work light of FIG. 1.

FIG. 11 illustrates an exemplary circuit diagram 168 of the work light 100. The circuit diagram 168 illustrates the layout of various electrical components of the work light 100, including the battery 106, a power switch 170 associated with the power button 112, a port power output (and/or input) 176 associated with the first and second ports 118, 119, the LEDs 154, and the like. Of course, the illustrated circuit diagram 168 is only one example of the configuration of the electrical components of the work light 100, and other configurations are also contemplated herein.

In some embodiments, the body 102 may include ferromagnetic members to magnetically couple the work light 100 to a support surface. The ferromagnetic members may be completely disposed within and concealed by the body 102. Alternatively, the ferromagnetic members may be part of a module that is coupled to the body 102 in a manner similar to or instead of the rafter hook 123. The ferromagnetic members may include permanent magnets that can engage a support surface that is sufficiently magnetic (such as a structure made at least in part of steel, iron, or the like). In some situations, a user may elect to affix a magnet to a non-magnetic support surface with, for instance, a fastener or adhesive. In such situations, the ferromagnetic members may include metal plates that magnetically engage the magnet that has been affixed to the support surface to support the work light 100 from the support surface even if the support surface is itself not sufficiently magnetic (such as a vertical work surface made of wood).

In some embodiments, the body 102 may include a nail hook or slot such that the work light 100 may be hung from a nail extending from a support surface. The hook or slot may be integrated into the body 102. Alternatively, similar the ferromagnetic members, the hook or slot may be part of a module that is coupled to the body 102 in a manner similar to or instead of the rafter hook 123.

Although particular embodiments have been shown and described, other alternative embodiments will become apparent to those skilled in the art and are within the intended scope of the independent aspects of the disclosure. Various features of the disclosure are set forth in the claims.

What is claimed is:

1. A work light comprising:

a body including a user interface and a battery receptacle, the battery receptacle configured to receive a battery; and a light head pivotally coupled to the body about a pivot axis, the light head including a housing, a light panel positioned within the housing and configured to be operated by the user interface, and a plurality of light emitting diodes (LEDs) supported on the light panel, each LED having a maximum LED brightness, wherein the light panel produces a maximum rated brightness of the work light, wherein the plurality of LEDs are configured to cooperate to provide the maximum rated brightness of the work light, and wherein the maximum rated brightness of the work light is less than a sum of the maximum LED brightnesses of the plurality of LEDs;

wherein the light head does not include a heat sink and has at least 1.5 LEDs per square inch.

2. The work light of claim 1, wherein the plurality of LEDs is configured to emit an actual brightness level over an entire operational period of the work light, and wherein the actual brightness level is within 5% of the maximum rated brightness level.

3. The work light of claim 2, wherein the maximum rated brightness level is between 800 and 1200 lumens.

4. The work light of claim 1, wherein the light head has at least 2 LEDs per square inch.

5. The work light of claim 4, wherein the light head has about 2.2 LEDs per square inch.

6. The work light of claim 1, wherein the plurality of LEDs includes 20 LEDs.

7. The work light of claim 1, wherein the light head has an output area between 3 square inches and 36 square inches.

8. The work light of claim 7, wherein the output area is between 6 square inches and 18 square inches.

9. The work light of claim 1, wherein an edge of the light panel is in direct contact with the housing.

10. The work light of claim 1, wherein a side of the light panel opposite from the plurality of LEDs defines an air gap between the light panel and the housing.

11. The work light of claim 1, wherein the work light is configured to be supported by the battery when the battery is received in the battery receptacle.

12. The work light of claim 1, wherein the light head is pivotable relative to the body between a stowed position, in which the light head is in contact with the body, and a deployed position, in which the light head extends outwardly from the body.

13. The work light of claim 12, wherein the light head is also rotatable relative to the body about a rotation axis that is perpendicular to the pivot axis.

14. The work light of claim 1, further comprising:

a circuit board positioned within the body to control operation of the work light; and a heat sink coupled to the circuit board.

15. A work light comprising:

a body including a user interface and a battery receptacle, the battery receptacle configured to receive a battery; and a light head coupled to the body, the light head including a housing, a light panel positioned within the housing and configured to be operated by the user interface, and a plurality of light emitting diodes (LEDs) supported on the light panel, wherein the light head has at least 1.5 LEDs per square inch, wherein the work light has a maximum rated brightness level, wherein the plurality of LEDs is configured to emit an actual brightness level over an entire operational period of the work light, and wherein the actual brightness level is within 5% of the maximum rated brightness level.

16. The work light of claim 15, wherein the maximum rated brightness level is between 800 and 1200 lumens.

17. The work light of claim 15, wherein a side of the light panel opposite from the plurality of LEDs defines an air gap between the light panel and the housing.

18. A work light comprising:

a body including a user interface and a battery receptacle, the battery receptacle configured to receive a battery; and a light head coupled to the body, the light head including a housing, a light panel positioned within the housing and configured to be operated by the user interface, the light panel including an edge that is in direct contact with the housing, and a plurality of light emitting diodes (LEDs) supported on only one side of the light panel, wherein a side of the light panel opposite from the plurality of LEDs defines an air gap between the light panel and the housing.

19. The work light of claim 18, wherein the light panel has at least 1.5 LEDs per square inch.

20. The work light of claim 18, wherein the light head does not include a heat sink.

* * * * *